UNITED STATES PATENT OFFICE.

PETER BERESIN, OF ST. PETERSBURG, RUSSIA.

METHOD OF MANUFACTURING ARTIFICIAL CAOUTCHOUC.

No. 881,536.　　　　Specification of Letters Patent.　　　Patented March 10, 1908.

Application filed January 29, 1907. Serial No. 354,781.

*To all whom it may concern:*

Be it known that I, PETER BERESIN, a subject of the Emperor of Russia, and residing at No. 15 Snamenskaja street, St. Petersburg, in the Empire of Russia, civil engineer, have invented a new and Improved Method of Manufacturing Artificial Caoutchouc, of which the following is a specification.

This invention relates to a method of manufacturing artificial caoutchouc of a quality practically equal to the natural caoutchouc obtained from *Hevear guyanensis*. This method is carried out as follows: Cod-liver oil or a vegetable oil, preferably sun-flower oil (from *Helianthus annuus*) is treated in unpurified, but stale or vapid state, with chlorid of sulfur (sulfurous chlorid) containing as much free chlorin as possible, the proportion being 100 portions in weight of oil: 25 portions in weight of the chlorid, and the treatment being effected in suitably constructed apparatus. The chlorin is quickly absorbed by the oil and a spontaneous increase of temperature takes place. When the temperature has risen to 115° C., the further supply of the sulfurous chlorid is interrupted. After the mass has cooled, it is exposed for at least 10 days to the influence of the air, preferably, however, some days more because this is favorable for the quality of the product. The mass thus obtained has the color of amber, is elastic, and devoid of taste and smell. It is then reduced to small pieces which are dissolved in benzin. To accelerate the solution, the respective receptacle may be slightly heated, but not above 70° C. After the mass has become completely dissolved, first, matesite is added (a substance obtained from the juice of a plant of the species *Apocynaceæ* growing upon Madagascar), and then isoprene manufactured from fusel-oil of the formula $C_5H_8$ is added.

Matesite ($C_{10}H_{20}O_9$) is a tenacious and very adhesive substance, and forms the chief component of the juice of the before-mentioned plant. To obtain the matesite from this juice, the latter is poured into a solution of kitchen-salt containing 2 grams of the chlorid of sodium per 100 grams of water, and the whole is shaken for about half an hour, the solution of the chlorid of sodium assuming during this time a whitish-turbid color and a scent like beer. Then the salt-solution is separated from the juice or mass, preferably by pouring the whole upon a sieve, the solution passing through the meshes, the mass being retained by the same. The latter is now washed in cold water, whereby it loses its adhesiveness and becomes elastic. After this the mass is reduced to pieces, and is heated, under vacuum, with benzin, the vacuum being preferably as near as possible to 100%. By and during this treatment, only the components of the mass are dissolved that are of use for the manufacture of the artificial caoutchouc.

To produce isoprene, pure amyl-alcohol ($C_5H_{12}O$) is slightly heated, and is treated with fuming sulfuric acid, while, at the same time, air is forced into and through the mixture until the development of sulfurous acid ($SO_2$) ceases. There results a compact black mass which then is forced through a felt-filter and thereafter treated with caustic lime CaO). The liquor obtained after the solid particles have deposited is subjected to a dry fractionation. After the light ethers, among them malic ether, there escapes an oily body of extraordinarily disgusting smell, upon which as soon as the temperature has risen to 117° C. isoprene is developed and continues to escape until the distillation is finished and coke remains as residue in the still.

Mixing the ingredients or components from which the artificial caoutchouc is produced is effected as follows: To the solution of matesite in benzin is added the before-mentioned amber-colored mass obtained in the manner above described (and termed, by the inventor, "kautscheen"; pronounced caoutchane), and after these substances have been thoroughly mixed also the isoprene is added; then the whole mass is passed through a stirring- and grinding-device (for instance such as known as the "system Uhland") and the product so obtained is introduced into dephlegmators in which, by the simultaneous application of slight heating and vacuum, the artificial caoutchouc is freed from the benzin, the resulting product being now the artificial caoutchouc proper, ready for use and possessing all properties that are to be found in the genuine caoutchouc obtained from *Hevear guyanensis.* Care should be taken in the last phase of the process that removing the benzin in which the before mentioned substance here dissolved is effected at only a very slight increase of temperature.

Having now described my invention what I desire to secure by a patent of the United States is:

1. The method of producing artificial caoutchouc, consisting in treating an oil, as described, with sulfurous chlorid, dissolving the thus obtained mass in benzin, mixing this solution with a solution of matesite and of isoprene in benzin, and removing the benzin from the resulting product, substantially as set forth.

2. The method of producing artificial caoutchouc consisting in treating a vegetable oil, with sulfurous chlorid, dissolving the thus obtained mass in benzin, mixing this solution with a solution of matesite and of isoprene in benzin, and removing the benzin from the resulting product, with the aid of heat, substantially as set forth.

3. The method of producing artificial caoutchouc, consisting in treating sun-flower-oil, with sulfurous chlorid, dissolving the thus obtained mass in benzin, mixing this solution with a solution of matesite and of isoprene in benzin, and removing the benzin from the resulting product, with the aid of heat and under a vacuum, substantially as set forth.

4. The method of producing artificial caoutchouc consisting in treating an oil, as described, with sulfurous chlorid, dissolving the thus obtained mass in benzin, mixing this solution, with a solution of matesite and of isoprene in benzin, and removing the benzin from the resulting product, under vacuum and with the aid of very slight heat, substantially and for the purpose as described.

In testimony, that I claim the foregoing as my invention, I have signed my name in presence of two subscribing witnesses.

PETER BERESIN.

Witnesses:
CYPRIAN KOSSOBUDZKI,
H. LOVIAGUINE.